Dec. 29, 1964   J. A. DAHLGREN   3,163,025
SEMI-AUTOMATIC ICE MAKER
Filed Aug. 24, 1962   3 Sheets-Sheet 1

INVENTOR.
JOHN A. DAHLGREN
BY Walter E. Rule

HIS ATTORNEY

Dec. 29, 1964  J. A. DAHLGREN  3,163,025
SEMI-AUTOMATIC ICE MAKER
Filed Aug. 24, 1962  3 Sheets-Sheet 2

INVENTOR.
JOHN A. DAHLGREN
BY *Walter E. Rule*
HIS ATTORNEY

Dec. 29, 1964   J. A. DAHLGREN   3,163,025
SEMI-AUTOMATIC ICE MAKER
Filed Aug. 24, 1962   3 Sheets-Sheet 3

INVENTOR.
JOHN A. DAHLGREN
BY *Walter E. Rule*
HIS ATTORNEY 3,163,025
SEMI-AUTOMATIC ICE MAKER
John A. Dahlgren, Louisville, Ky., assignor to General
Electric Company, a corporation of New York
Filed Aug. 24, 1962, Ser. No. 220,123
3 Claims. (Cl. 62—177)

This application is a continuation-in-part of my copending application Serial No. 154,304 (now abandoned) filed November 22, 1961 and assigned to the same assignee as the present invention.

This invention relates to a semi-automatic ice maker and is more particularly concerned with an improved semi-automatic ice service for household refrigerators including freezers.

In recent years, various devices have been used or proposed for the automatic making, harvesting and storing of ice pieces in domestic refrigerators. The completely automatic devices have included relatively expensive control circuitry and operating means for automatically initiating and sequentially operating the devices through the ice making, ice harvesting and water filling steps. The resultant high cost thereof has limited their use in any but the higher priced lines of refrigerators as a substitute for the usual freezing trays which are manually filled with water and from which the ice pieces are manually discharged.

A semi-automatic ice service for household refrigerators providing most of the advantages of the completely automatic ice maker at a much lower cost is described and broadly claimed in the copending application of Harold P. Harle, S.N. 155,879 (now Patent 3,089,312) filed November 8, 1961 and assigned to the same assignee as the present invention. The semi-automatic ice maker of the Harle application provides means for manually harvesting ice pieces without completely removing the freezing tray or mold from the refrigerator and means for automatically refilling the freezing tray with water following a harvesting operation.

The present invention is an improvement over the semi-automatic ice maker of the Harle application, which ice maker was invented by said Harold P. Harle prior to the present invention. Therefore it is not intended to claim herein anything shown or described in said Harle application which is to be regarded as prior art with respect to the present invention.

The present invention has as its primary object the provision of a semi-automatic ice maker including an improved means for controlling the supply of water to the freezing tray or mold.

Another object of the invention is to provide, in a semi-automatic ice maker including an automatic water supply means, a single water supply control means adapted to supply water to the freezing tray or mold only when the freezing tray is in its normal freezing position and is empty.

A further object of the invention is to provide improved means for interrupting the supply of water to a freezing tray when the tray is filled.

Further objects and advantages of the invention will become apparent as the following description proceeds and the features of novelty which characterize the invention will be pointed out with particularity in the claims annexed to and forming a part of this specification.

In carrying out the objects of the present invention, there is provided a semi-automatic ice maker for a freezer compartment of a household refrigerator comprising a freezing tray, a water supply means for automatically supplying charges of water to the tray and means for supporting the tray in the compartment for movement between a first or ice making position in which the tray is positioned to receive a charge of water from the water supply means and a second or harvesting position in which the ice pieces formed in the tray can be manually harvested there from. The tray is also supported on its support for vertical movement of at least a portion thereof, such as one edge thereof, between an upper position when the tray is empty and a lower position when the tray is filled with water or ice. Means for controlling the flow of water to the tray is operatively arranged with reference to the vertically movable portion of the tray so that the water is supplied to the tray whenever the tray is in its first and upper position within the compartment and is interrupted whenever the tray is moved either to its second or harvesting position or when it becomes filled with water and drops to its lower position. A specific aspect of the present invention includes an improved means for positioning the tray in its upper and lower positions which comprises a pivot arm having its free or movable end engaging the tray, spring means urging the arm upwardly to hold the tray in its upper position when empty and to permit the tray to drop to its lower position when filled with water and a magnetic latching means which assists the spring in holding the tray in its upper position in such a manner that when the added holding force of the magnetic latching means is overcome by the weight of the water, the tray will immediately and completely drop to its lower position.

For a better understanding of the invention reference may be had to the accompanying drawings in which.

Figure 4:
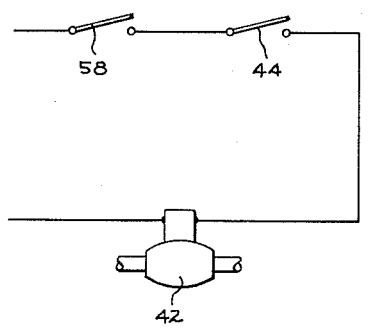
Figure 5:
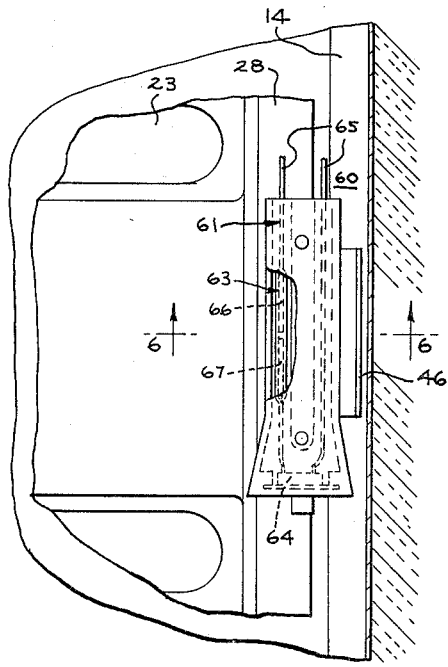
Figure 6:
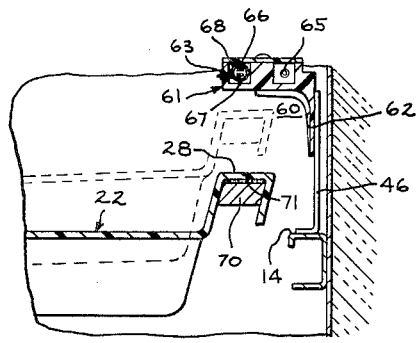

FIGURE 4 diagrammatically illustrates an electrical control circuit employed for the semi-automatic operation of the ice maker of the present invention;

FIGURE 5 is a partial plan view illustrating a modification of the present invention; and FIGURE 6 is a sectional view of the modification taken generally along line 6—6 of FIGURE 5.

Figure 1:
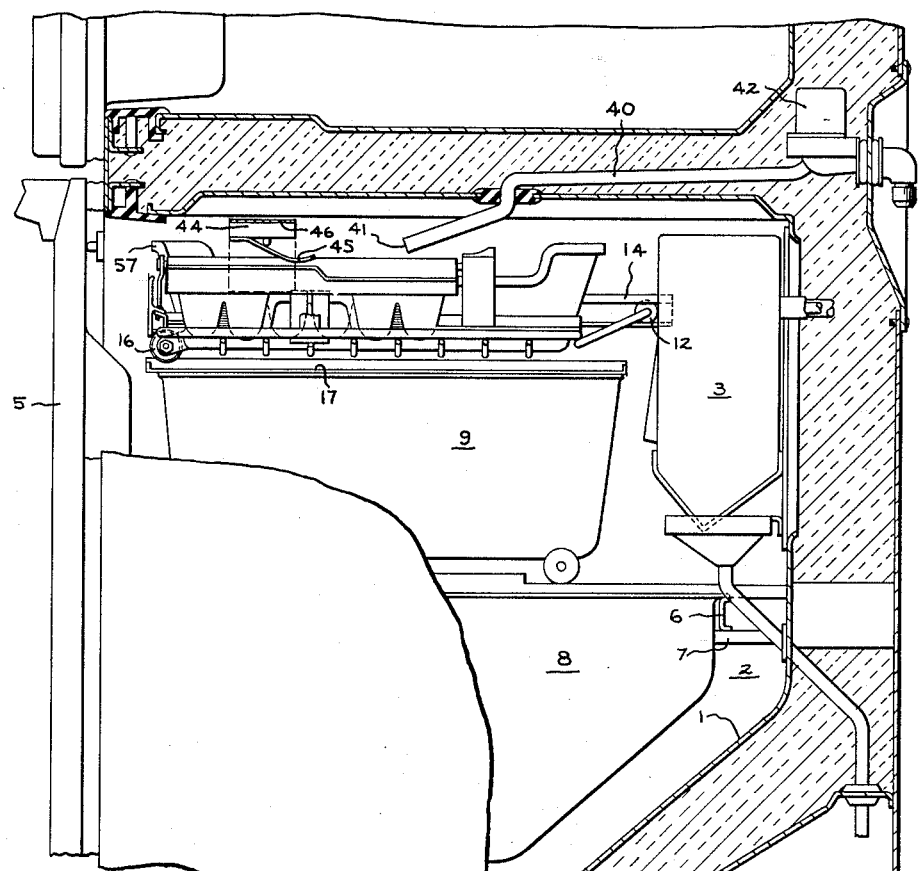
FIGURE 1 is a side elevational view, partly in section, of a freezer compartment of a refrigerator including a semi-automatic ice maker of the present invention.

Referring to FIGURE 1 of the drawing, there is shown a refrigerator cabinet including a liner 1 forming a freezer compartment 2 for the storage of frozen foods. The contents of this compartment are maintained at below freezing temperatures by means of an evaporator contained with a housing 3 supported on the rear wall of the compartment 2, air from the compartment 2 being circulated through the housing 3 in heat exchange with the evaporator by means of a fan (not shown).

As the freezer compartment illustrated in the drawing is at the lower part of the refrigerator cabinet illustrated in the drawing, a convenient means for the storage of foodstuffs and the like comprises a sliding drawer assembly including a closure member or drawer front 5 for closing the access opening to the compartment. This drawer front 5 is part of a drawer assembly that also includes a pair of spaced slides connected together by front and rear cross members 6 to form an open cradle or frame adapted to ride in guides 7 fixed to the side walls of the compartment 2. A lower storage pan 8 is supported within the cradle or framework while an upper storage pan 9 is supported by the same framework in such a manner that while it normally moves forward with the framework whenever the drawer is opened, it can be moved rearwardly when the drawer is opened to provide access to the lower pan 8. A drawer structure of this type is more fully described in Patent 2,843,441—Jewell issued July 15, 1958 and assigned to the same assignee as the present invention and reference is made to that patent for more complete description of the drawer and its mode of operation.

Figure 2:
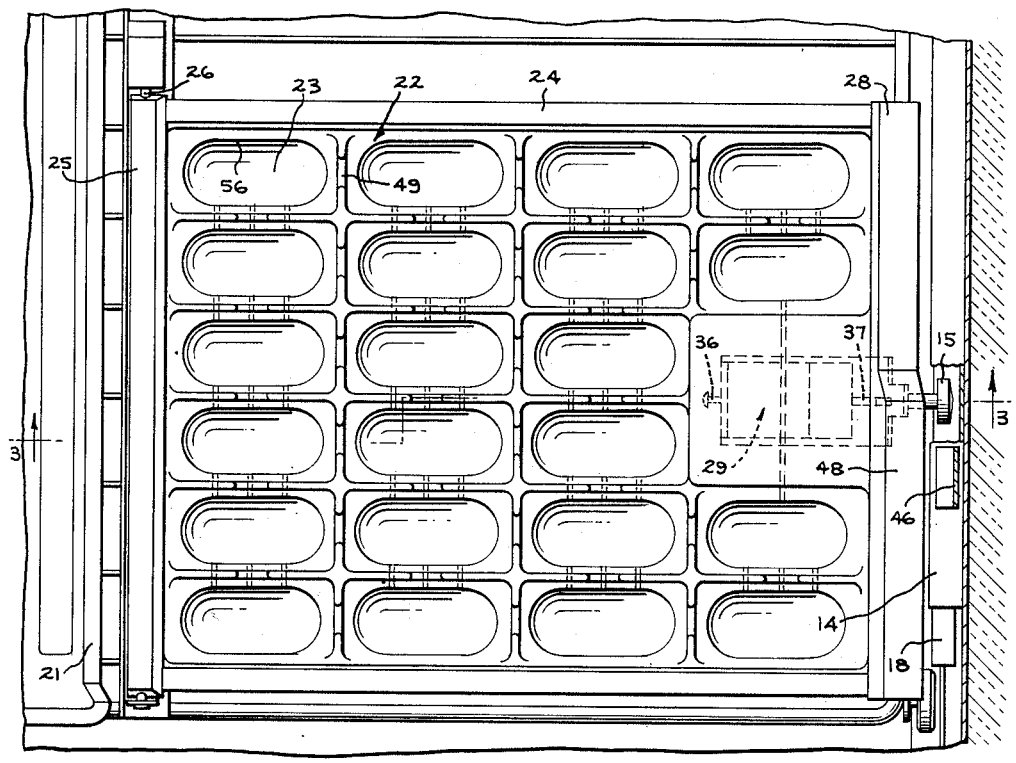
FIGURE 2 is a top view of the freezing tray component of the ice maker of the present invention.

The semi-automatic ice maker of the present invention is illustrated as being mounted within the freezer compartment 2 above the pan 9. It comprises a sliding assembly including a shelf 11 supported at its rear corners by rollers 12 which ride in guides 14 secured to the side walls of the compartment 2. For supporting the forward end of the shelf, the shelf is provided with a pair of opposed rollers 15 which ride in the guides 14 when the shelf is in or near its recessed position within the cabinet and a second pair of rollers 16 which ride on a track 17 provided on the upper edges of pan 9 when the drawer and shelf are in the extended or access position. As shown in FIGURE 2 of the drawing, the guides 14 terminate short of the front of the cabinet so that the drawer is open and the shelf is moved forwardly to an accessible position outside of the cabinet, rollers 15 become disengaged from track 14 and rollers 16 then drop onto track 17. Normally, or in other words when the shelf 11 is in its recessed position, the rollers 16 as shown in FIGURE 1, are out of contact with the rail 17 and the shelf is supported at a fixed elevation by rollers 12 and 15. So that rollers 15 will again ride onto guide 14 as the shelf is returned to the compartment the forward ends 18 of the guides 14 slope downwardly into the path of the rollers 15 as the shelf is moved rearwardly.

The shelf 11 provides horizontally movable means for supporting an ice storage receptacle 21 and a freezing mold or stray 22 within the compartment 2. In the illustrated embodiment, the receptacle 21 is positioned on the left hand side of the shelf while the freezing tray 22 is supported on the right hand side of the shelf as viewed in FIGURE 3 of the drawing. By this side-by-side relationship, ice pieces can be harvested from the tray 22 by moving the shelf forwardly to its access position and tilting the tray about one end thereof to an inverted position above the receptacle 21 so that the ice pieces will drop directly into the receptacle when released from the tray.

The tray 22 can be of any construction such that the ice pieces will be readily released therefrom when the tray is inverted to its harvesting operation. The main portion of the tray is preferably composed of a plastic material such as polyethylene which has a low adhesion for ice and thereforep rovides easy release of the ice pieces from the pockets 23 by twisting of the tray. This main portion is secured within a frame 24. One edge 25 of the frame portion of the tray is pivotally supported on the shelf by means of pivot pins 26 which form an axis adjacent one edge of the tray about which the tray is inverted from its freezing position as illustrated in the drawing to an inverted position above the receptacle 21.

Figure 3:
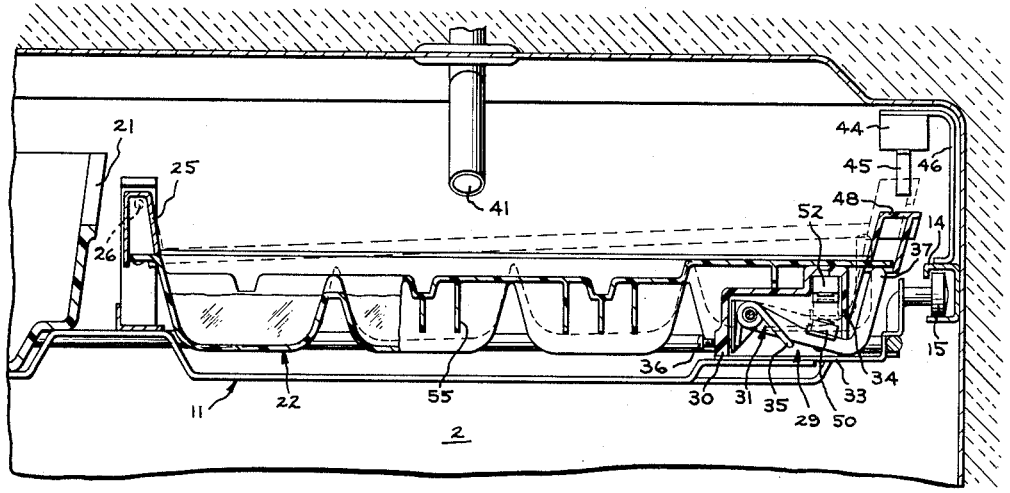
FIGURE 3 is a sectional view taken generally along line 3—3 of FIGURE 2.

The free or opposite edge 28 of the tray is supported by means of a weighing device generally indicated by the numeral 29 which is designed to hold the tray when empty in its upper or dotted line position as shown in FIGURE 3 and to permit the tray to drop to its lower or full line position when filled with water. The weight actuated device 29 is contained within a plastic housing 30 mounted on the shelf 11 beneath the tray adjacent the tray edge 28. Within the housing there is provided an arm 31 having one end pivotally mounted on the housing walls for movement of its other end 37 between a lower position in which a portion of the arm engages a stop 33 forming part of the shelf 11 and an upper position in which the arm engages a suitable stop such as the side wall 34 of the housing. A spring 35 is provided for normally urging or biasing the arm 31 to its upper position into engagement with the stop. As the free end 37 of the arm extends outwardly through the housing 30 and contacts the lower surface of the tray edge 28, the spring 35 causes arm 31 to raise the tray to its upper or dotted line position when the tray is empty.

For the purpose of automatically supplying a charge of water to the tray when the tray is empty and in its freezing and recessed position within the compartment, there is provided a water supply means comprising a water supply line 40 having its outlet end 41 positioned so that it is above the tray 22 when the tray and shelf are in their normal recessed positions within the compartment 2. A solenoid valve 42 in the supply line 40 connects that line to a source of water, as for example to the house water supply, in such a manner that when the valve 42 is opened water flows through the supply line into the tray 22.

Automatic control of the water supply means is obtained by means of valve control circutiry essentially including a switch adapted to complete a control circuit for valve 42 which opens the valve when the tray is in its upper position and closes the valve when the tray drops to its lower positon. In the embodiment of the invention illustrated in FIGURES 1 and 3, there is provided a switch 44 having an actuating arm 45 positioned to be operated by the tray edge 28. The switch 44, or more specifically the actuating arm 45, mounted in fixed relationship with the shelf 11 in order to provide an accurate control of the valve by the position of the tray. More specifically, the switch 44 carrying the actuating arm 45 is mounted on a bracket 46 accurately fastened to guide 14 so that the switch arm 45 is in a fixed vertical position with reference to the shelf 11 supported by the guides 14 and in turn supporting the freezing tray. In order to assure that the valve 42 will not be opened when the tray is slightly out of position with reference to the water outlet 41, the tray edge 28 is provided with a shoulder or stepped portion 48 forming the actual switch contacting or actuating portion of the tray. By placing this step or raised portion 48 in spaced relation with the rear edge of the tray, actuation of the switch 44 by the tray is prevented unless the tray is properly positioned beneath the water outlet 41.

By this ararngement in which the valve control swtich is actuated by contact of the tray edge 28 with the switch arm 45 only when the tray is in its first position within the compartment 2 and is empty, a single switch can be employed both for the purpose of introducing a measured quantity of water into the tray 22 and for preventing the flow of water through the supply line 40 whenever the tray is not in its first position.

When it is desired to harvest a batch of ice pieces from the freezing tray 22 or to remove ice pieces previously harvested from the receptacle 21, the entire shelf 11 is moved from its normal or recessed position within the compartment 2 to an extended or forward position outside of that compartment in which both the receptacle and tray are accesible and in which the tray can be inverted manually about its pivot point to a discharge position above the receptacle. If the shelf 11 is thereafter returned to its normal position within the compartment 2 with the tray empty, the tray will be in its upper or dotted line position as shown in FIGURE 3 of the drawing and the shelf will be supported by the rollers 12 and 15 in the guide 14. The raised or stepped portion 48 of the tray edge will then contact the switch arm 45 to open the valve 42. Water will flow from the water supply line into the tray and be distributed to the various ice pockets 23 by means of the slots 49 provided in the tray walls between the pockets 23. When the weight of this water is sufficient, the arm 29 and the tray will drop to their full line positions as shown in FIGURE 3 of the drawing whereby the raised portion 48 of the tray edge 28 will become disengaged from the switch actuating arm 45 thereby closing solenoid valve 42. The tray 22 will remain in this lower position relative to the switch arm 45 until the ice pieces formed therein have been harvested. If for any reason the tray is pulled forwardly from beneath the water supply outlet 41 when it is empty or only partially full or in other words when it is still in its upper position, disengagement of the tray edge portion 48 with the switch arm 45 will cause the valve 42 to close and interrupt the flow of water from the supply line 40. Returning of the tray to its recessed or normal position will again cause the valve 42 to open and supply whatever additional water is necessary to cause the tray to move to its full or lower position.

In order to obtain an abrupt movement of the tray from its upper to its lower position when the desired quantity of water has been introduced into the tray and to avoid the gradual lowering which would result if only a spring, such as the spring 35, were employed to bias the arm 29 to its upper position, there is provided magnetic means associated with the weighing device adapted in cooperation with the spring 35 to obtain a quick or abrupt lowering of the tray when filled. This magnetic means as shown in FIGURE 3 includes a magnet 50 secured to the top wall of housing 30 and a keeper or armature 52 mounted on the arm 31. When the arm is in its upper position, the magnet 50 and the keeper 52 are in engagement with one another and provide a magnetic holding force which assists the spring 35 in releasably holding the tray in its upper position. The magnet 50 should, of course, provide a holding force which is insufficient to prevent the tray from dropping to its lower position when filled with water.

The spring 35 need only be strong enough to raise the tray to its upper position when tray is empty or when it contains a relatively small amount of water or a few ice cubes. Once the tray is in its upper position the magnetic means provides the required additional force for holding the tray in its upper position until the tray is filled with a predetermined weight of water. Once the magnet and keeper 50 and 52 have become separated due to the weight of this water, the forces holding the tray in its upper position are substantially diminished to that furnished by the spring 35. The tray will then quickly drop to its lower position. An adjusting screw 36 bearing on the spring 35 may be used to regulate the biasing and lifting action of the spring.

As previously indicated the tray 22 is preferably made of polyethylene or the like having good ice releasing properties. However since plastic materials of this type are easily deformed by relatively slight pressures, it has been found that occasionally the walls of the ice pockets 23 will become bowed due to the expansion of the ice within the pockets and that the repeated bowing may cause permanent set and ultimate locking of an ice piece in a pocket. To avoid this, there may be provided a plurality of connecting ribs 55 between the relatively large and flat side walls 56 of adjacent ice pockets for strengthening these walls and preventing bowing or permanent setting thereof. These ribs are sufficiently flexible so that when the tray is inverted to its ice harvesting position above the receptacle 21 they will not interfere with the flexing of the tray for the purpose of discharging the ice from the pockets 23 into the receptacle.

To provide substantial flexing of the tray when in its inverted position, the one edge 57 of the receptacle 21 which is engaged by the raised or stepped portion 48 of the tray when the tray is in the inverted position may also be raised as indicated in FIGURE 1 of the drawing so that pressure applied to the free end of tray at a point removed from this contact area will cause a substantial twisting action to effect a release of all of the ice pieces from the tray.

Also, if desired for additional safety, the ice maker control circuit, as illustrated in FIGURE 4, of the drawing, may include an additional switch 58 operated by the closure member 5 and held in an open position whenever the closure member is in open position relative to the access opening to the compartment 2 so that the supply valve 42 cannot open under these conditions. This switch 58 is not essential for the intended operation of the ice maker of the present invention. However, it does prevent accidental discharge of water into the compartment 2 when the freezing tray is out of position as, for example, when the entire drawer assembly and the ice maker are removed from the compartment for cleaning or other purposes.

In the modification of the invention illustrated in FIGURES 5 and 6 of the drawing, the mechanically operated switch 44 and its associated operating arm 45 are replaced by a magnetic switch such as a magnetic reed switch and this reed switch is adapted to be operated by means of a permanent magnet carried by the edge 28 of the tray. In describing the modification of the invention illustrated in FIGURES 5 and 6, the same reference numerals used in the description of the embodiment illustrated in FIGURES 1-3 will be used to indicate the same or similar elements or parts.

The magnetic reed switch forms part of an assembly generally indicated by the reference numeral 60 adapted to be supported on the bracket 46 so that it overlies the free edge 28 of the tray 22. This assembly comprises a non-magnetic plastic housing 61 and a bracket 62 for securing the housing to the bracket 46. The non-magnetic housing 61 contains a magnetic reed switch 63 positioned in the housing so that it is above the free or movable edge 28 of the tray 22 when the shelf 11 is in its recessed position, a manually operated switch 64 positioned at the front of the housing so that it is accessible from the front of the compartment 2 and leads 65 connecting the manually operated switch 64 and the reed switch 63 in series as part of a control circuit for the control of the valve 42.

As is shown more clearly in FIGURE 6 of the drawing, the reed switch 63 includes a pair of magnetic reed elements 66 and 67 contained within a glass envelope 68, the elements 66, 67 being adapted when magnetized to be attracted to one another and thereby close an electrical circuit by contact with one another.

In this modification of the invention, the tray edge 28 need not have a raised portion corresponding to the edge 48. Instead it is provided with a permanent magnet 70 secured by any suitable means to the tray edge 28. In the illustrated embodiment, the magnet is secured to the bottom side of edge 28 by means of an adhesive material 71. This magnet is arranged so that when the tray is in its recessed position within the compartment 2 the magnet will be positioned opposite and in spaced relation to the magnetic reed switch 63. The magnet 70 is of a strength such that when the tray is in its filled or lowered position, the magnetic reed switch 63 will be outside of or not affected by the magnetic field and will remain open but when the tray is in its raised or dotted line position as illustrated in FIGURE 6 in which the magnet is closer to the switch 63, the reed elements 66 and 67 will be magnetically affected and closed. Closing of the elements 66, 67 completes the valve opening circuit when the manual switch 64 is closed. This manual switch 64 is provided for the convenience of the user so that the automatic fill of the ice maker can be dispensed with if the user so desires.

When the magnetic switch means is employed for the control of the semi-automatic operation of the ice maker, the door switch 58 may be omitted since the magnetic switch 63 cannot be operated except by the magnet 70. In other words, when the drawer is opened or the drawer, shelf and tray removed from the compartment 2 for cleaning purposes or the like, the switch means 63 cannot be accidentally closed during the cleaning operation.

A magnetic switch of the type illustrated in FIGURES 5 and 6 also has a number of additional advantages over a mechanical switch such as the switch 44 and its associated operating means. The magnetic switch does not in itself apply any pressure to the free edge 28 of the tray so that the spring means 35 does not have to be adjusted to compensate for any downward biasing action of the switch means in addition to the weight of the water. In other words, since only the weight of the water and not the weight of the water plus a biasing action of the switch means causes the tray to move to its lowered position, the amount of water supplied to the tray can be more accurately controlled. In addition the magnetic switch can be completely hermetically sealed within the housing 61 so that moisture in the compartment 2 will not adversely affect the operation of the switch elements.

While the invention has been described with reference to specific modifications thereof and a particular type of refrigerator, it will be obvious that it is not limited thereto. For example, a horizontally movable tray support in the form of a sliding shelf or the like may be incorporated in any front or top opening freezer compartment and operatively positioned with reference to a water supply line so that the tray carried by the support is movable between a freezing position beneath the supply line and a discharge position spaced from that supply line. It is therefore intended by the appended claims to cover all such modifications as are within the spirit and scope of the invention.

What I claim as new and desire to secure by Letters Patent of the United States is:

1. An ice maker for a freezer compartment comprising:
    a shelf and means for supporting said shelf within said compartment for movement horizontally between a first position and a second position;
    a freezing tray pivotally supported along one edge on said shelf,
    means including a weight actuated device for supporting the other edge of said tray on said support means for movement of said other edge from an upper position when said tray is empty to a lower position when said tray is filled with water,
    said weight actuated device comprising spring means biasing said other edge of said tray to its upper position and magnetic means for releasably holding said other edge of said tray in its upper position,
    said magnetic means and said spring means permitting movement of said tray to its lower position when filled with water,
    water supply means including a normally closed solenoid operated valve and an outlet arranged above said tray when said shelf is in its first position, and
    valve control means for controlling said valve comprising a normally open switch having an actuating arm mounted in fixed vertical relation with said shelf in a position above said other tray edge when said shelf is in its first position for opening said valve only when said shelf is in its first position and said tray is in its upper position.

2. A refrigerator including a freezer compartment comprising:
    an access opening at the front of said compartment,
    a shelf slidably arranged in said compartment for movement between a recessed position within said compartment and an extended position,
    a freezing tray,
    means for pivotally supporting one edge of said tray on said shelf for manual movement of said tray about an axis adjacent said one edge between a freezing position and an inverted discharge position when said shelf is in its extended position,
    means for supporting the opposite edge of said tray for movement of said opposite edge from an upper position when said tray is empty to a lower position when said tray is filled with water,
    a water supply line having its outlet end above said tray when said tray is in its freezing position and said shelf is in its recessed position within said compartment,
    a normally closed electrically operated valve in said line for controlling the flow of water to said tray,
    and a valve-control circuit for operating said valve comprising a normally open switch having an operating arm disposed above said opposite edge of said tray when said shelf is in its recessed position and said tray is in its freezing position,
    said opposite edge of said tray including a raised portion for contacting said arm and closing said switch only when said shelf is in its recessed position and said tray is in its upper position.

3. A refrigerator including a freezer compartment comprising:
    a support means arranged in said compartment for movement between a first position and a second position,
    a freezing tray,
    means for pivotally supporting one edge of said tray on said support means for manual movement of said tray about an axis adjacent said one edge between a freezing position and an inverted discharge position when said support means is in its second position,
    means for supporting the opposite edge of said tray for movement of said opposite edge from an upper position when said tray is empty to a lower position when said tray is filled with water,
    a water supply line having its outlet end above said tray when said tray is in its freezing position and said support means is in its first position,
    an electrically operated valve in said line for controlling the flow of water to said tray,
    and a valve control circuit having a single switch operating said valve which is responsive to both the position of the support means and the position of the tray so that the single switch is incapable of being actuated by the tray except when the support is in its first position and when the tray is in its upper position.

References Cited by the Examiner
UNITED STATES PATENTS

| | | | |
|---|---|---|---|
| 2,407,058 | 9/46 | Clum | 62—137 |
| 2,850,072 | 9/58 | Bryans | 292—251.5 X |
| 2,908,778 | 10/59 | Strandberg | 200—87.3 X |
| 2,990,697 | 7/61 | Buzicky | 62—345 |
| 2,994,205 | 8/61 | Brubaker et al. | 62—353 X |
| 3,046,754 | 7/62 | Kniffin | 62—135 |
| 3,048,986 | 8/62 | Archer | 62—345 |
| 3,089,312 | 5/63 | Harle | 62—344 X |

ROBERT A. O'LEARY, *Primary Examiner.*

MEYER PERLIN, EDWARD J. MICHAEL, *Examiners.*